United States Patent [19]

Kobayashi

[11] Patent Number: 4,699,427
[45] Date of Patent: Oct. 13, 1987

[54] VEHICLE SEAT
[75] Inventor: Hideo Kobayashi, Akishima, Japan
[73] Assignee: Tachi-S Co., Ltd.
[21] Appl. No.: 907,520
[22] Filed: Sep. 15, 1986
[51] Int. Cl.$^4$ .............................................. A47C 7/02
[52] U.S. Cl. .................... 297/452; 297/218; 297/DIG. 1
[58] Field of Search .................. 297/DIG. 1, 452, 459, 297/218, 224

[56] References Cited

U.S. PATENT DOCUMENTS

| | | | |
|---|---|---|---|
| 2,921,625 | 1/1960 | Krasnov et al. | 297/224 |
| 3,612,607 | 10/1971 | Lohr | 297/452 |
| 3,736,022 | 5/1973 | Radke | 297/DIG. 1 |
| 3,773,875 | 11/1973 | Lammers | 297/DIG. 1 |
| 4,577,907 | 3/1986 | Talmon et al. | 297/452 |
| 4,579,388 | 1/1986 | Urai | 297/452 |

Primary Examiner—James T. McCall
Attorney, Agent, or Firm—Oldham, Oldham & Weber, Co.

[57] ABSTRACT

A seat for use in vehicles such as automobiles, airplanes and the like is disclosed which is formed by adhesively attaching a trim cover assembly to a cushion member formed of a foam material. The trim cover assembly comprises a center portion and a side bolster portion which are formed separately from each other. The ends of the center and side bolster portions of the trim cover assembly are respectively inserted into and bonded to the cushion member, so that loads applied to the center portion of the trim cover assembly will not be transmitted to the side bolster portion of the trim cover assembly.

6 Claims, 15 Drawing Figures

VEHICLE SEAT

BACKGROUND OF THE INVENTION

1. Field of the Invention

The present invention relates to a vehicle seat such as an automotive seat and, more particularly, to such seat which is manufactured by adhesively attaching a trim cover assembly to a cushion member formed by foaming in a mold in the external shape of the seat.

2. Description of the Prior Art

As shown in FIG. 1, in order to manufacture a vehicle seat, conventionally, a trim cover assembly forming the outer surface of the seat and comprising a center portion (13) and side bolster portions (12), (12) formed of different materials is adhesively attached to a cushion member (10a) formed of a foam material. In this prior art seat, the trim cover assembly is formed into an integral body by sewing together the material of the center portion (13) and the material of the side bolster portions (12), (12), while the foamed cushion member (10a) is formed with cutaway grooves (21), (21) on the surface thereof at the positions thereof corresponding to the sewn portions (20), (20) of the above-mentioned trim cover assembly. Then, adhesives are applied over the entire surface of the cushion member (10a) and the the sewn portions (20), (20) of the trim cover assembly in which the center portion (13) is sewn together with the side bolster portions (12), (12) are inserted respectively into the cutaway grooves (21), (21) of the cushion member (10a) so that the center portion (13) and the side bolster portions (12) of the trim cover assembly are bonded and fixed to the cushion member (10a), (FIG. 2).

Accordingly, in the prior art seat, as mentioned above, the center portion (13) and the side bolster portions (12), (12) forming the trim cover assembly must be sewn up together to each other, which results in a poor efficiency in manufacturing the seat as well as requires skill in sewing the corners of the trim cover assembly. Also, after bonded to the cushion member (10a), the center portion (13) and the side bolster portions (12), (12) are connected integrally to each other. Therefore, when an occupant is seated on the center portion (13) (that is, loads are applied onto the center portion (13), then the center portion (13) is pulled by the side bolster portions (12), (12). In other words, the cushioning property of the cushion member (10a) lying under the center portion (13) is restricted by the side bolster portions (12), (12) so that a desired cushioning property can not be obtained.

SUMMARY OF THE INVENTION

The present invention aims at eliminating the drawbacks found in the above-mentioned conventional seat.

Accordingly, it is an object of the invention to provide a seat which eliminates the above-mentioned drawback, that is, the impairment of the cushioning property of the cushion member found when the center portion is connected integrally to the side bolster portions, both of which center and side bolster portions cooperate to form the trim cover assembly, as in the above-mentioned conventional seat.

In attaining the above object, according to one aspect of the invention, the above-mentioned center and side bolster portions are not integrally connected to each other, but are arranged separately from each other. And, the terminals of the center and side portions are respectively inserted into the cutaway grooves in the cushion member so that the center and side portions are separately bonded to the cushion member.

In other words, there is eliminated the need to sew together the center and side portions as in the above-mentioned prior art seat, and also the center and side portions are bonded to the cushion member separately from each other. Therefore, when loads are applied to the center portion, the center portion is not pulled by the side bolster portions, so that the cushioning property of the cushion member lying under the center portion will not be restricted by the side bolster portions.

It is another object of the invention provide a seat which has an improved cushioning property in the central portion thereof.

To accomplish this object, according another aspect of the invention, the cushion member is composed of a body portion and a center portion to be fitted into the body portion. That is, to produce the cushion member, the body and center portions are respectively covered with and bonded to separate trim cover assemblies, and then the center portion covered with one trim cover assembly is fitted and fixed to the body portion covered with the other trim cover assembly. Therefore, there is formed a narrow and deep groove between the center portion of the trim cover assembly covering the center portion of the cushion member and the side bolster portions of the trim cover assembly covering the body portion of the cushion member. Also, since the center portion of the trim cover assembly can be formed of a material which is different in color from that of the side bolster portions, it is possible to provide a seat which is excellent in appearance.

Also, since the cushion member is composed of the body portion and the center portion that are formed separately from each other, the center portion can be formed of a foam material which is more flexible than that of the body portion, so that the cushioning property of the central portion of the seat can be improved. Further, due to the fact that the center portion of the trim cover assembly covering the center portion of the cushion member is formed separately from the side bolster portions of the trim cover assembly covering the body portion of the cushion member, even when the central portion of the seat is flexed, the center portion of the trim cover assembly forming the seat central portion will not be pulled by the side bolster portions of the trim cover assembly to cover the body portion of the cushion member, which means that the cushioning property of the central portion of the seat will not be impaired.

The above and other related objects and features of the invention will be apparent from a reading of the following description of the disclosure found in the accompanying drawings and the novelty thereof pointed out in the appended claims.

DETAILED DESCRIPTION OF PREFERRED EMBODIMENTS OF THE INVENTION

Figure 1:
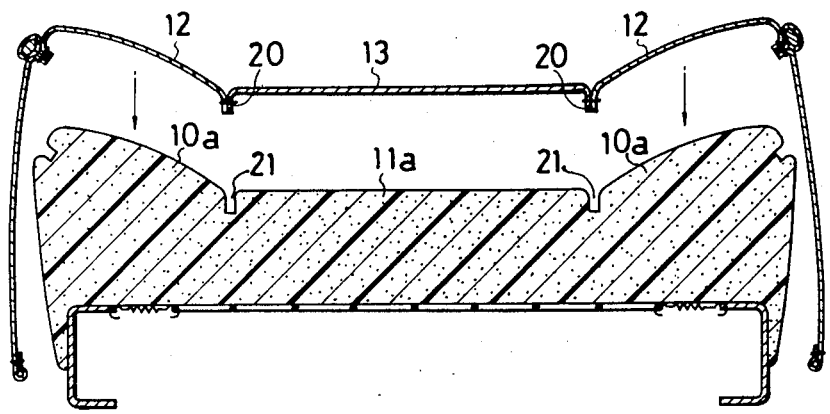
FIG. 1 is a section view of a conventional seat before the components thereof are adhesively attached to one another.
Figure 2:
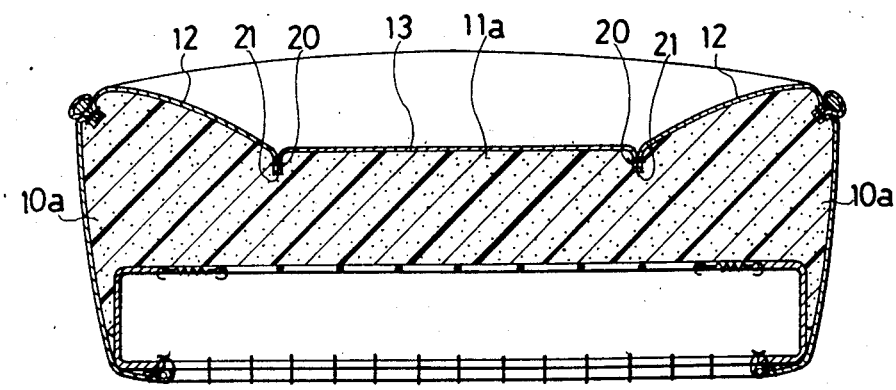
FIG. 2 is a section view of the above-mentioned conventional seat after the components thereof are adhesively attached to one another.
Figure 3:
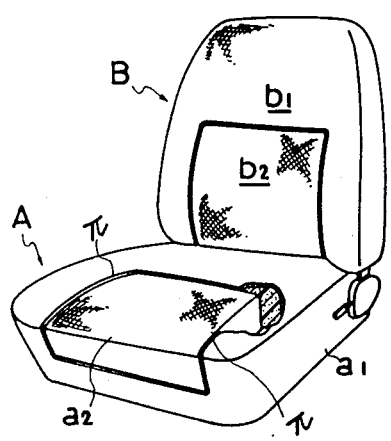
FIG. 3 is a partially cutaway perspective view of a first embodiment of a seat constructed in accordance with the invention.
Figure 4:
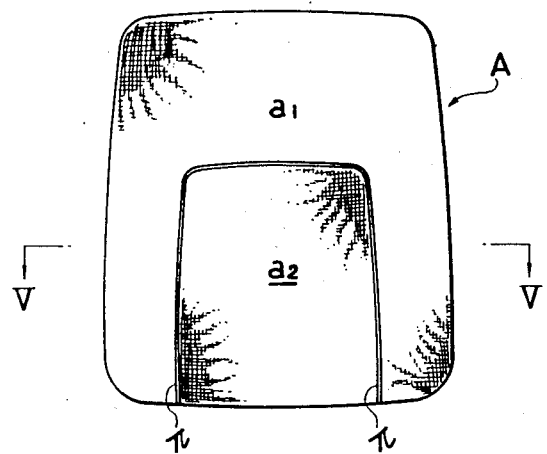
FIG. 4 is a plan view of a seat cushion included in the first embodiment of the invention.

Referring now to FIG. 3, there is illustrated a seat for use in a vehicle (e.g., for an automobile) constructed in accordance with the invention. In the drawings, reference character (A) designates a seat cushion, and (B) a seat back, which are respectively composed of main bodies (a1)(b1) and center bodies (a2)(b2). The center bodies (a2)(b2) are respectively formed separately from the main bodies (a1)(b1), and the center bodies (a2)(b2) are respectively fitted into and fixed to recessed portions formed in the main bodies (a1) (b1) so as to provide the seat cushion (A) and the seat back (B), respectively.

Figure 5:
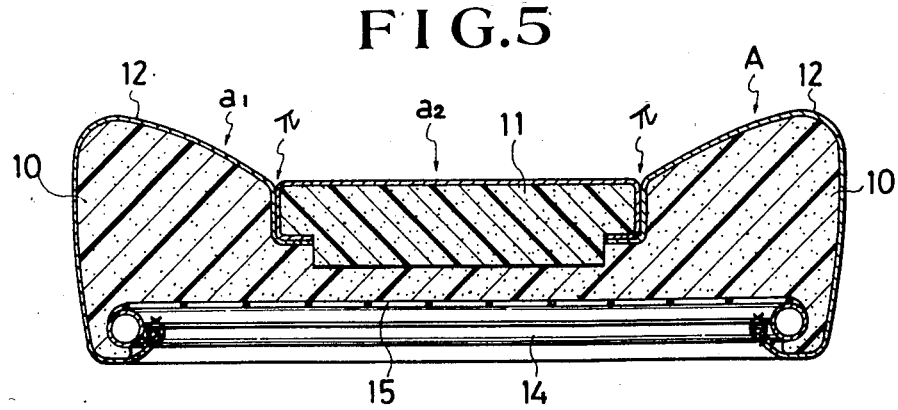
FIG. 5 is a section view taken along the line V—V in FIG. 4.

The above-mentioned main body (a1) and center body (a2), as shown in FIG. 5, are respectively composed of a cushion member formed of a foam material such as urethane foam or like material and a trim cover assembly to be adhesively attached to the externally exposed surface of the cushion member. The cushion member of the main body (a1) is supported by spring members (15) extended over a frame (14).

Figure 6:
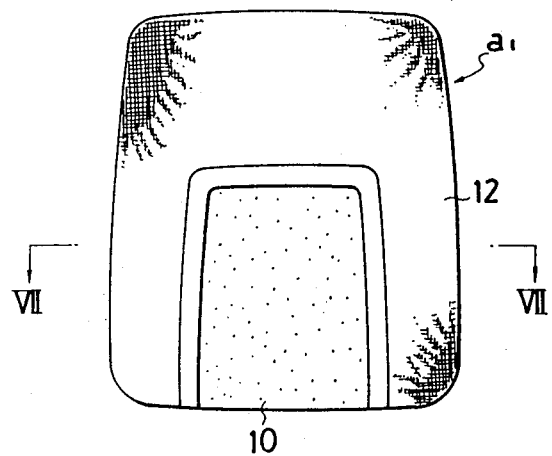
FIG. 6 is a plan view of a main body employed in the invention.
Figure 7:
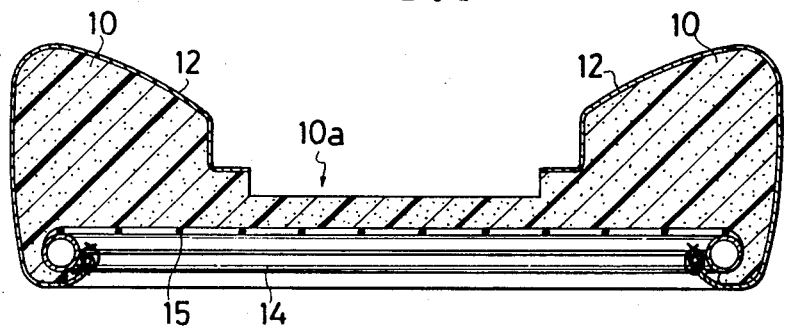
FIG. 7 is a section view taken along the line VII—VII in FIG. 6.
Figure 8:
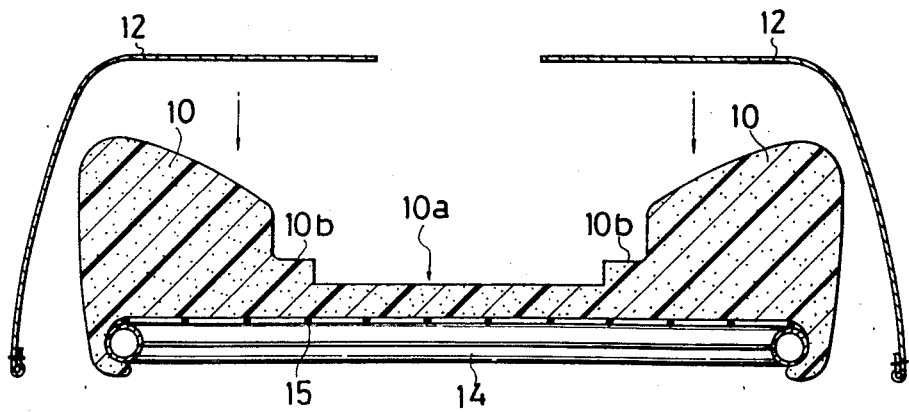
FIG. 8 is a section view to show a state in which a cushion member of the main body of the seat is disassembled from the side bolster portions of a trim cover assembly.

In FIGS. 6 through 8, there is shown the main body (a1) which is formed by adhesively attaching a side bolster portion (12) of the trim cover assembly to a body portion (10) comprising the cushion member formed on the upper surface thereof with a recessed portion (10a) into which the above-mentioned center body (a2) is fitted. The above-mentioned recessed portion (10a) is formed in the periphery of the bottom portion thereof with a step portion (10b), up to the top surface of which step portion (10b) the side bolster portion (12) is bonded. The body portion (10) may be foamed integrally and together with the frame (14) and spring member (15) or may be formed separately from the frame (14) or the like. In any case, the body portion (10) as shown, is fixed to the frame (14) or the like by fastening the terminal end of the trim cover assembly (12) to the frame (14) or the like. The side bolster portion (12) of the above-mentioned trim cover assembly covering the body portion (10) is cut in such a shape that it is able to cover the entire surface of the body portion (10) except the bottom surface of the recessed portion (10a).

The recessed portion (10a) is located in a position which corresponds to the center portion (13) of the trim cover assembly, and the depth of the recessed portion (10a) may be varied suitably according to the cushioning property of the center body (a2) or the like.

Figure 9:
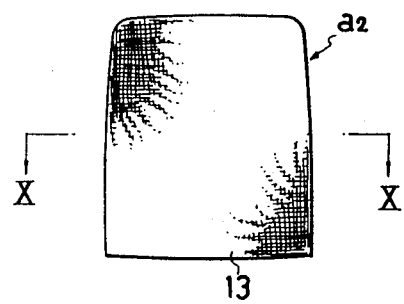
FIG. 9 is a plan view of a center body employed in the invention.
Figure 10:
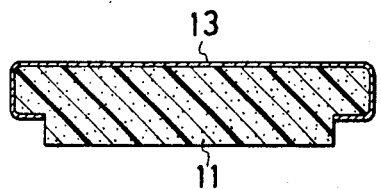
FIG. 10 is a section view taken along the line X—X in FIG. 9.
Figure 11:
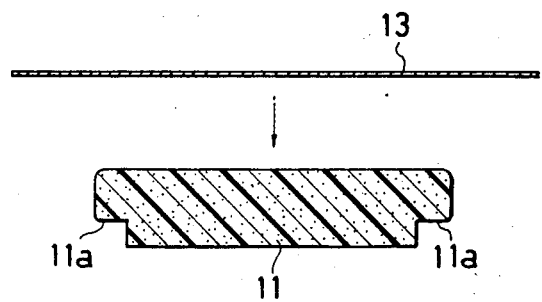
FIG. 11 is a section view to show a state in which the cushion member forming the center body is disassembled from the center portion of the trim cover assembly.
Figure 12:
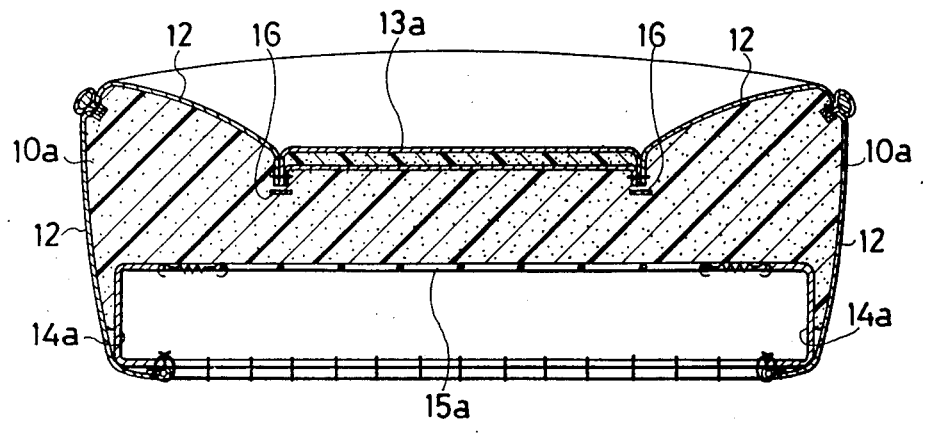
FIG. 12 is a section view of a second embodiment of the invention.
Figure 13:
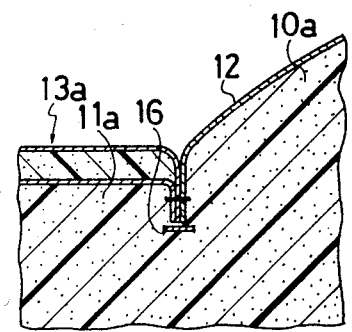
FIG. 13 is an enlarged longitudinal section view of main portions of the second embodiment.

In FIGS. 9 through 11, there is shown the center body (a2) which includes a center portion (11) comprising a foamed cushion member formed so as to be able to fit into the recessed portion (10a) of the above-mentioned main body (a1), and side bolster portion (13) of the trim cover assembly bonded to the entire surface of the cushion member except the bottom surface of the center portion (11) and the vertical surface of a step portion (11a) succeeding the center portion (11) bottom surface. The above-mentioned center portion (11) may be formed of the same foam material as with the above-mentioned body portion (10), but, however, it is desired that the center portion is formed of a flexible material such as a slab material.

The center portion (13) of the center body (a2) may be arbitrarily formed of a material different from that of the side bolster portion (12) of the above-mentioned main body (a1) (preferably, woven stuff better in air-permeability, feeling of touch and the like than material of the side bolster portion (12)), and also may be formed in color and pattern different from the side portion (12), so that the appearance of the seat cushion (A) may be enhanced. This center portion (13), as with the side bolster portion (12) is adhesively attached to the center portion (11) to which an adhesive has already been applied by a sprayer or the like.

When the center body (a2) is fixed to the bottom surface of the recessed portion of the main body (a1) by use of an adhesive, velvet-type fastener, hang-in member or the like, then the seat cushion (A) as shown in FIG. 3 is obtained and there are formed decorative recessed grooves ($\pi$) between the center body (a2) and the main body (a1).

As has been described heretofore, according to the first embodiment of the invention, there is provided a seat which is excellent in appearance without impairing the strong points found in the conventional bonded seat. In other words, due to the fact that the center portion and side bolster portions of the trim cover assembly are formed separately from each other, and due to the fact that the center portion of the cushion member to be covered with the center portion of the trim cover assembly is formed separately from the body portion of the cushion member to be covered with the side bolster portions of the trim cover assembly, there is formed a deep recesesd groove between the center portion and side bolster portions of the trim cover assembly, so that the center portion of the seat can be formed in a three-dimensional manner. Also, the center portion of the trim cover assembly can be formed of a material which is different in color, pattern, and the like from that of the side portion of the trim cover assembly, so that the appearance of the seat can be improved.

Further, according to the invention, since the body portion and center portion of the cushion member are formed separately from each other, the center portion of the cushion member can be formed arbitrarily of a foam material having a better cushioning property and the like than the body portion of the cushion member, with the result that a seat which provides a comfortable feeling of sitting can be supplied. Also, since the main body existing in the periphery of the center portion is not affected by loads applied to the center portion of the cushion member, the seat is prevented against deformation.

Referring now to FIGS. 12 through 15, there is shown a second embodiment of the invention. In these figures, reference numeral (13a) designates a center portion which forms a trim cover assembly, and (12)(12) respectively stand for side bolster portions formed integrally with gore portions, both of which, (13a) and (12)(12) are formed of separate materials for decorative purposes or the like.

Figure 14:
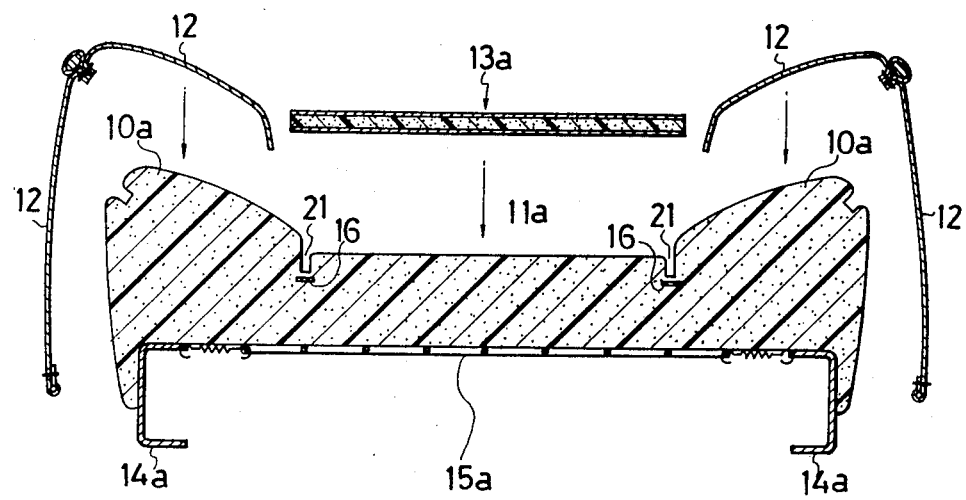
FIG. 14 is a section view of the second embodiment of the invention before the trim cover assembly is adhesively attached to the surface of the cushion member; and, FIG. 15 is a perspective view of the second embodiment after the trim cover assembly is adhesively attached to the surface of the cushion member.
Figure 15:
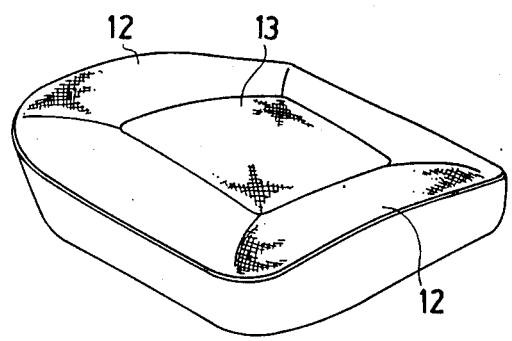

In the drawings, (10a)(11a) designate a foamed cushion member which is produced by integrally forming a center portion (11a) and a body portion (10a). Along boundary lines between the above-mentioned center portion (13a) placed on the upper surface of the cushion member and the side bolster portions (12)(12), there are formed cutaway grooves (21)(21). These cutaway grooves (21)(21) are formed when the cushion member (10a)(11a) is mold formed. And, reinforcement members (16)(16) such as rough wool or the like are embedded during the formation of the grooves (21)(21) such that they are located in the bottom portions of the cutaway grooves (21), (FIG. 14).

Accordingly, after adhesives are applied onto the upper surface of the thus formed cushion member (10a)(11a) as well as into the cutaway grooves (21)(21) by use of a sprayer or the like, the end of the center portion (13a) and the ends of the side bolster portions (12)(12) on the side of the center portion (13a) are pushed into the ends of the cushion member (10a)(11a), so that they are bonded and fixed to the ends of the cushion member (10a)(11a). In this pushing operation, if a grasping device capable of grasping the end of the above-mentioned center portion (13a) as well as the ends of the side bolster portions (12)(12) on the side of such center portion end is used, then both of the ends can be fixed at a time.

Due to the fact that the reinforcement members (16)(16) are provided in the bottom portions of the cutaway grooves (21)(21) in the cushion member (10a)(11a), when the ends of the center portion (10a) and the like are pushed into the cutaway grooves (21)(21), there is no possibility that the grooves (21)(21) may be cut further deeper. Also, since the reinforcement members (16)(16) restrict the amounts of insertion of the ends to be pushed into the grooves to a given level, the center portion (10a) and the like can be arranged in a properly stretched manner with no wrinkles being produced thereon.

The illustrated center portion (10a) is a combined body of three elements, that is, a top cover member, a foam wadding and a wadding cover, but, however, according to cases, it also may be formed of a single piece of cloth or the like which has an air permeability.

As can be understood from the foregoing description, according to the second embodiment of the invention, in a state before the trim cover assembly is bonded to the surface of the cushion member, the center portion and the side bolster portions which cooperate to form the trim cover assembly are formed separately from each other and thus there is eliminated the need to sew the center and side portions into an integral body as in the prior art seat, resulting in a higher productivity of the seat. Also, since the center and side portions are not connected to each other even after the trim cover assembly is bonded to the cushion member to complete the seat, the cushioning property of the cushion member located under the trim cover assembly center portion will not be restricted by the side bolster portions as in the prior art seat, so that the cushion member can perform its desired cushioning property to provide a comfortable sitting feeling.

What is claimed is:

1. A vehicle seat formed by adhesively attaching a trim cover aseembly to a cushion member of a foam material, said cushion member comprising a body portion having a recessed portion in the portion thereof corresponding to a center portion, and a center portion to be fitted into said recessed portion in said body portion, wherein said trim cover assembly comprises a trim cover assembly side bolster portion to cover the surface of said cushion member except the bottom surface of said recessed portion in said cushion member, and a trim cover assembly center portion to cover said center portion of said cushion member, and wherein said trim cover assembly center portion is bonded up to the peripheral wall of said center portion of said cushion member, said trim cover assembly center portion and trim cover assembly side bolster portion being formed separately from each other, and said center portion of said cushion member to which said trim cover assembly center portion is bonded is fitted into and fixed to said body portion of said cushion member to which said trim cover assembly side bolster portion is bonded.

2. A vehicle seat as set forth in claim 1, wherein there is provided a step portion in the periphery of the bottom portion of said recessed portion in said cushion member, and said side bolster portion of said trim cover assembly is bonded up to the top surface of said step portion.

3. A vehicle seat as set forth in claim 1, wherein there is formed a recessed groove for decoration in the periphery of said center portion of said cushion member to which said center portion of said trim cover assembly fixed to said body portion of said cushion member is bonded.

4. A vehicle seat formed by adhesively attaching a trim cover assembly to a cushion member of a foam material, wherein said trim cover assembly comprises a trim cover assembly center portion and a trim cover assembly side bolster portion, and wherein there is formed a cutaway groove in the portion of the surface of said cushion member that corresponds to a boundary line between said trim cover assembly center portion and trim cover assembly side bolster portion of said trim cover assembly, and wherein further, the end of said trim cover assembly center portion of said trim cover assembly and the end of said trim cover assembly side bolster portion formed separately from said trim cover assembly center portion are respectively inserted into and bonded to said cutaway groove.

5. A vehicle seat as set forth in claim 1, wherein a reinforcement member is embedded in the bottom portion of the cutaway groove in said cushion member.

6. A vehicle seat as set forth in claim 1, wherein said center portion of said cushion member is formed of a foam material more flexible than that of said body portion of said cushion member.

* * * * *